US009193359B2

(12) United States Patent
Hui et al.

(10) Patent No.: US 9,193,359 B2
(45) Date of Patent: Nov. 24, 2015

(54) VEHICLE SYSTEMS AND METHODS FOR IDENTIFYING A DRIVER

(71) Applicant: GM GLOBAL TECHNOLOGY OPERATIONS LLC, Detroit, MI (US)

(72) Inventors: Tze On Hui, Novi, MI (US); Brian T. Timmermann, Commerce, MI (US); Daniel T. Cohen, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 40 days.

(21) Appl. No.: 13/964,857

(22) Filed: Aug. 12, 2013

(65) Prior Publication Data

US 2015/0045984 A1    Feb. 12, 2015

(51) Int. Cl.
*B60R 22/00*      (2006.01)
*B60W 50/08*     (2012.01)
*B60R 16/02*      (2006.01)
*B60R 16/037*    (2006.01)

(52) U.S. Cl.
CPC .............. *B60W 50/085* (2013.01); *B60R 16/02* (2013.01); *B60R 16/037* (2013.01); *B60W 2540/04* (2013.01); *B60W 2540/28* (2013.01)

(58) Field of Classification Search
CPC ............ B60R 21/01516; B60R 16/037; B60R 21/01532; B60R 21/01534; B60R 16/02; B60R 21/0152; B60R 21/01536; B60R 21/01546; B60R 21/01548; B60R 21/01552

USPC .................. 701/31.4, 36; 382/124; 340/438
See application file for complete search history.

(56) References Cited

U.S. PATENT DOCUMENTS

| | | | |
|---|---|---|---|
| 6,505,780 B1 * | 1/2003 | Yassin et al. .................. 235/492 |
| 2002/0059022 A1 * | 5/2002 | Breed et al. ..................... 701/45 |
| 2002/0069004 A1 * | 6/2002 | Marchthaler et al. ........... 701/49 |
| 2004/0263344 A1 * | 12/2004 | Young et al. .................. 340/667 |
| 2005/0043876 A1 * | 2/2005 | Fultz et al. ..................... 701/45 |
| 2005/0261815 A1 * | 11/2005 | Cowelchuk et al. ............ 701/36 |
| 2008/0306656 A1 * | 12/2008 | Baumann et al. ............... 701/45 |
| 2009/0010502 A1 * | 1/2009 | Hackbarth et al. ............ 382/124 |
| 2010/0161171 A1 * | 6/2010 | Valentine et al. ............... 701/33 |
| 2012/0053793 A1 * | 3/2012 | Sala et al. ....................... 701/45 |
| 2013/0038437 A1 * | 2/2013 | Talati et al. ................... 340/438 |
| 2015/0045984 A1 * | 2/2015 | Hui et al. ........................... 701/1 |

OTHER PUBLICATIONS

Squatriglia, C., "The Car of Tomorrow Recognizes Your Butt", Dec. 2011; retrieved from the Internet on Aug. 12, 2013 from http://www.wired.com/autopia/2011/12/biometric-car-seat/.

* cited by examiner

*Primary Examiner* — Redhwan K Mawari
(74) *Attorney, Agent, or Firm* — Ingrassia Fisher & Lorenz, P.C.

(57) ABSTRACT

A vehicle system for a vehicle with an occupant is provided. The system includes a seat assembly; a sensor group associated with the seat assembly and configured to collect data about physical characteristics of the occupant of the seat assembly; and a control module coupled to the sensor group and configured to identify the occupant based on the collected data about the physical characteristics of the occupant.

12 Claims, 4 Drawing Sheets

US 9,193,359 B2

VEHICLE SYSTEMS AND METHODS FOR IDENTIFYING A DRIVER

TECHNICAL FIELD

The technical field generally relates to vehicle systems and methods, and more particularly relates to vehicle systems and methods for identifying a driver.

BACKGROUND

Modern vehicles typically allow driver to personalize the driver experience to enhance safety and comfort. For example, various vehicle devices such as seats, radios, climate systems, and the like may be automatically adjusted based on previously established settings stored in a profile. Similarly, other systems may allow keyless ignition for starting the vehicle. Despite these conveniences, conventional systems still require the identity of the driver in the form of a key-fob or other input device for selecting the driver.

Accordingly, it is desirable to provide improved systems and methods for identifying the driver. Furthermore, other desirable features and characteristics of the present invention will become apparent from the subsequent detailed description and the appended claims, taken in conjunction with the accompanying drawings and the foregoing technical field and background.

SUMMARY

In an exemplary embodiment, a vehicle system for a vehicle with an occupant is provided. The system includes a seat assembly; a sensor group associated with the seat assembly and configured to collect data about physical characteristics of the occupant of the seat assembly; and a control module coupled to the sensor group and configured to identify the occupant based on the collected data about the physical characteristics of the occupant.

In another exemplary embodiment, an identification system for an occupant of vehicle is provided. The system includes a sensor group configured to collect data about physical characteristics of the occupant; and a control module coupled to the sensor group and configured to identify the driver based on the collected data about the physical characteristics of the occupant.

In another exemplary embodiment, a method is provided for identifying a driver of a vehicle. The method includes collecting information about physical characteristics of the driver with an array of pressure sensors; generating a pressure map of the physical characteristics; calculating a prospective driver identifier from the pressure map; and selecting a driver profile associated with the driver from a profile unit based on the prospective driver identifier.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

The following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Broadly, exemplary embodiments discussed herein are directed to systems and methods for identifying a driver of a vehicle. In one exemplary embodiment, the systems and methods include a sensor group incorporated into a seat assembly to collect information about the physical characteristics of a driver. The driver information may be in the form of a pressure map. A control module derives or calculates a driver identifier from the pressure map and compares the driver identifier to potential driver identifiers in a group of profiles. Upon determining a match, the control module identifies the driver and implements the stored preferences associated with the identified driver.

Figure 1:
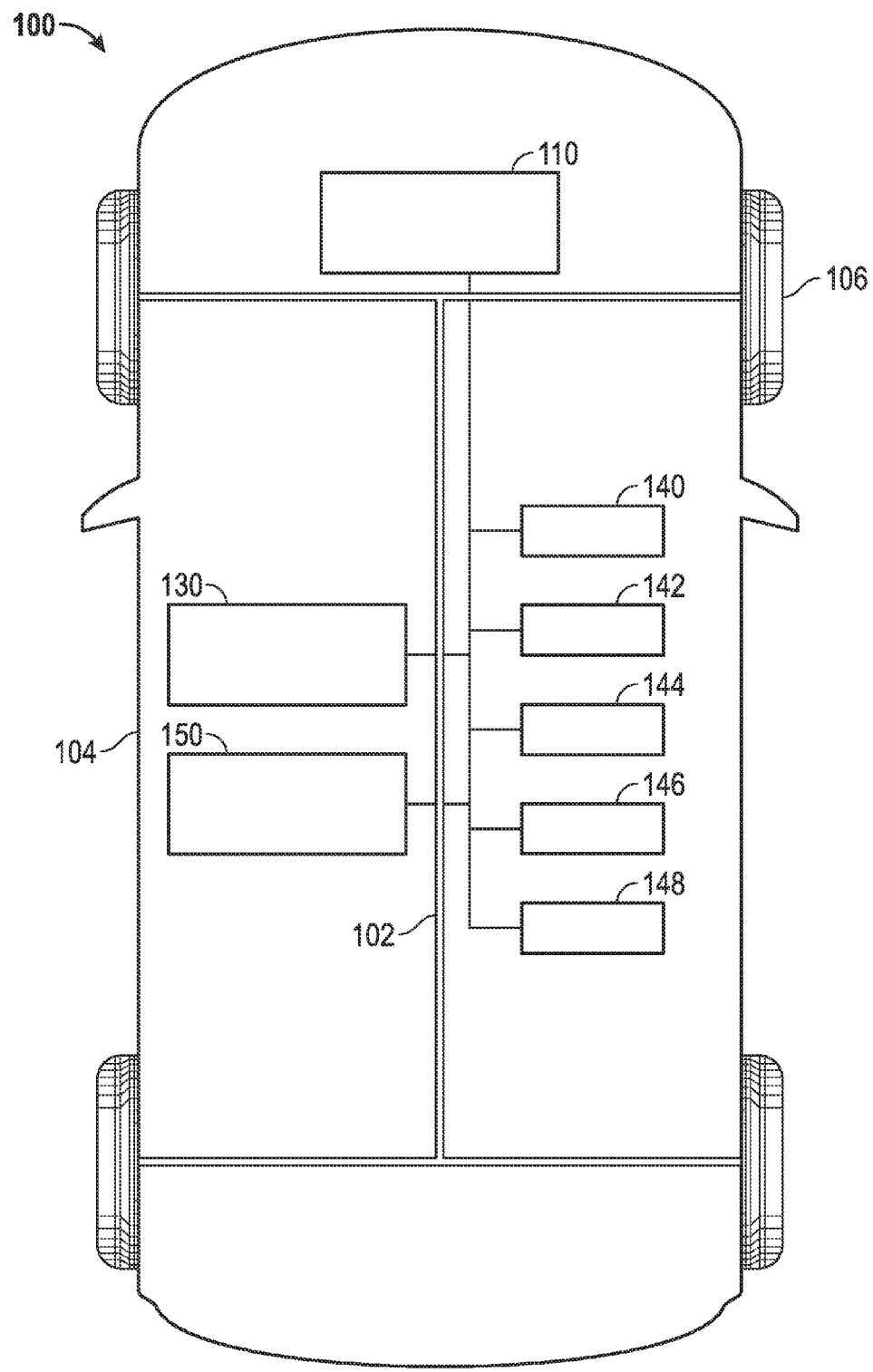
FIG. 1 is a functional block diagram of a vehicle that includes a system for identifying a driver in accordance with an exemplary embodiment.

FIG. 1 is a functional block diagram illustrating a vehicle 100 that includes a driver identification system 150 in accordance with exemplary embodiments. Additional details about the driver identification system 150 will be provided below after a brief description of the vehicle 100. In the depicted embodiment, the vehicle 100 has a generally known configuration with a chassis 102, a body 104, and four wheels 106. The body 104 is arranged on the chassis 102 and substantially encloses other components of the vehicle 100. The body 104 and the chassis 102 may jointly form a frame. The wheels 106 are each rotationally coupled to the chassis 102 near a respective corner of the body 104. The vehicle 100 may be any one of a number of different types of automobiles, such as, for example, a sedan, a wagon, a truck, or a sport utility vehicle (SUV), and may be a two, three, four, or more wheeled vehicle. The vehicle 100 may also incorporate any one of, or combination of, a number of different types of engines or actuator systems 110, which may include one or more of the following: an engine, a battery assembly, electric motor, drive shafts, and any other component typical of vehicle systems.

As noted below, the vehicle 100 includes a number of additional systems or components that interact with the driver identification system 150. These systems and components may include a seat assembly 130, an electronic control unit 140, an entertainment and/or infotainment system 142, a climate system 144, a seat adjustment system 146, and communication system 148, which are introduced below before a more detailed description of interaction and function with respect to the driver identification system 150.

The seat assembly 130 is schematically represented in FIG. 1. Typically, the seat assembly 130 is installed on a floor of the passenger area of a vehicle, such as the vehicle 100 described above. In one exemplary embodiment, the seat assembly 130 is a driver seat for an automobile, although in other exemplary embodiments, the seat assembly 130 may be a passenger seat. Additional details about the seat assembly 130 are provided below in the discussion of FIGS. 3 and 4.

The electronic control unit 140 may represent or otherwise interact with one or more electronic systems within the vehicle 100. For example, the electronic control unit 140 may store and execute operation control information that functions to control operation of the actuator system 110. In some embodiments, such operation control of the electronic control unit 140 may function as an ignition lock to prevent a potential driver from operating the vehicle 100 or keyless ignition of the engine. In other embodiments, the operation control implemented by the electronic control unit 140 may define operating styles of a particular driver, such as sporty or fuel efficient. Other functions of the electronic control unit 140 may include ride control, learned responses (e.g., transmission shift patterns, throttle progression, and enhanced stability control), driver restrictions or limitations (e.g., speed, handling, and navigation restrictions), and/or messages or warning based on predetermined events (e.g., navigation restrictions, careless driving, and the like).

As noted above, the vehicle 100 may further include the infotainment system 142. In general, the infotainment system 142 may include auxiliary devices or systems, such as the stereo system and/or navigation system. In some embodiments, the infotainment system 142 may correspond to a device or combination of devices for interacting with the vehicle 100. For example, the infotainment system 142 may include a display screen integrated the dashboard and user interfaces, such as a touch screen, buttons, and/or rotary dials.

Referring to the additional auxiliary systems, the climate system 144 may include heating and air conditioning units for adjusting a climate of the vehicle 100. The seat adjustment system 146 may include actuators and motors for adjustment of the seat assembly 130. In further embodiments, the vehicle 100 may include a communication system 148 that provides information about the vehicle 100 to an off-board information center. Any suitable auxiliary systems or devices may be provided. Additional details about the electronic control unit 140, infotainment system 142, climate system 144, seat adjustment system 146, and communication system 148 with respect to the driver identification system 150 will be provided below.

As introduced above, the vehicle 100 further includes the driver identification system 150. The driver identification system 150 is configured to identify a prospective driver sitting in the vehicle seat assembly 130. In general, the driver identification system 150 collects information about the physical characteristics of the driver and determines an individual identity of the driver based on this information. In one exemplary embodiment, the driver identification system 150 is actuated by a driver sitting in the seat assembly 130. In other embodiments, the driver identification system 150 may be actuated by other mechanisms, including the opening of a door and/or placing key in the vehicle ignition. Additional details about the driver identification system 150 will now be provided.

Figure 2:
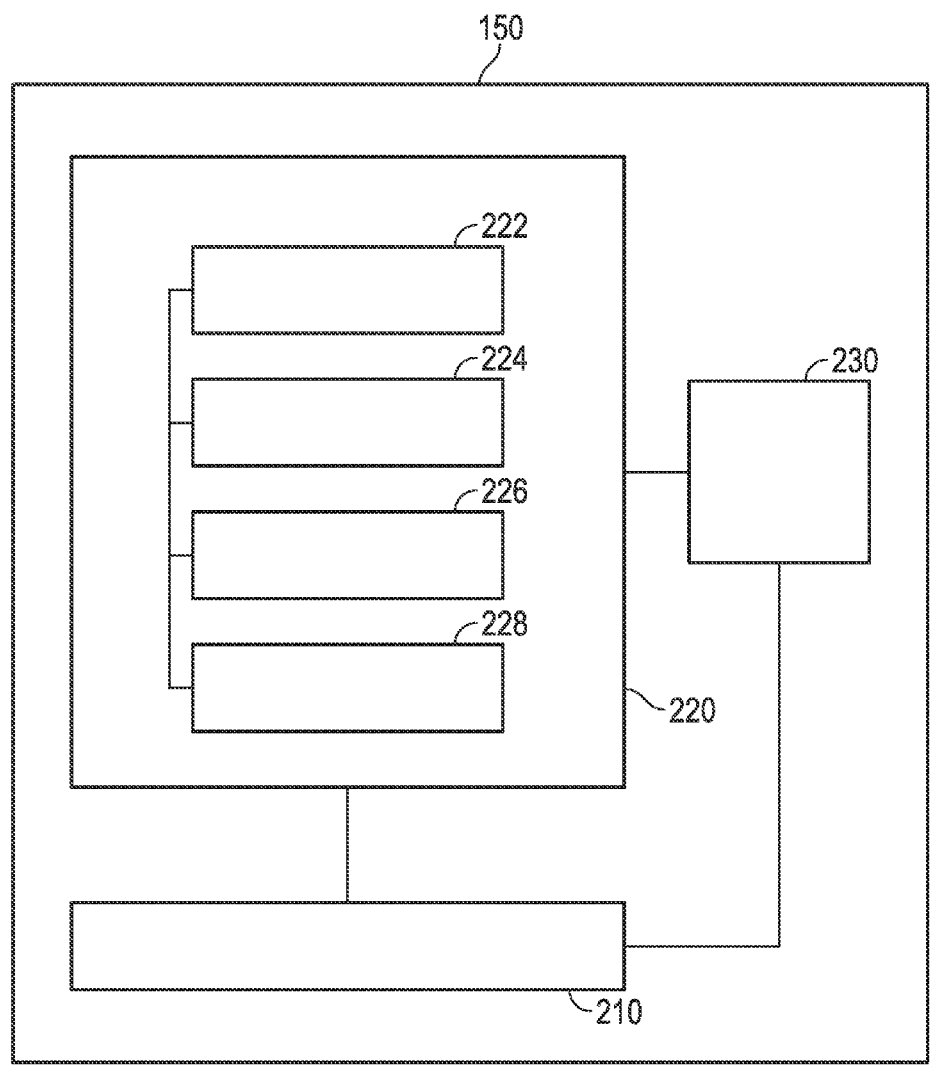
FIG. 2 is a functional block diagram of the driver identification system of FIG. 1 in accordance with an exemplary embodiment.

FIG. 2 is a schematic block diagram of the driver identification system 150 of the vehicle 100 of FIG. 1 in accordance of with an exemplary embodiment. As shown, the driver identification system 150 includes a sensor group 210, a control module 220, and a user interface 230. In general, the user interface 230 enables interaction between the user and the driver identification system 150. As such, the user interface 230 may include any suitable device or devices, including a display, touch screen, buttons, keyboard, rotary dials, and the like. In one exemplary embodiment, the user interface 230 may be integrated with the infotainment system 142.

The sensor group 210 includes an array of sensors that collect information about the physical characteristics of the driver sitting in the seat assembly 130 (FIG. 1). The physical characteristics may include the size, geometry, dimensions, bulk, and other parameters of the driver. In one exemplary embodiment, the physical characteristics may be associated with the legs and thighs of the driver. The sensor group 210 may include pressure sensors that collectively define a pressure map for each driver, which may be used to calculate a driver identifier, as described in greater detail below.

Figure 3:
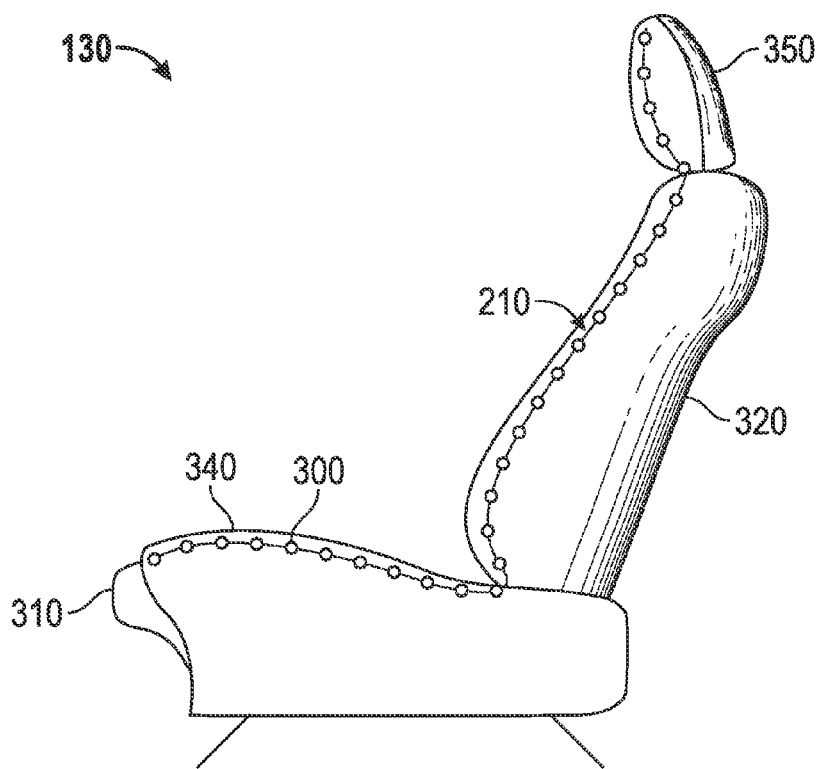
FIG. 3 is a schematic side view of a seat assembly associated with the driver identification system of FIG. 2 in accordance with an exemplary embodiment.
Figure 4:
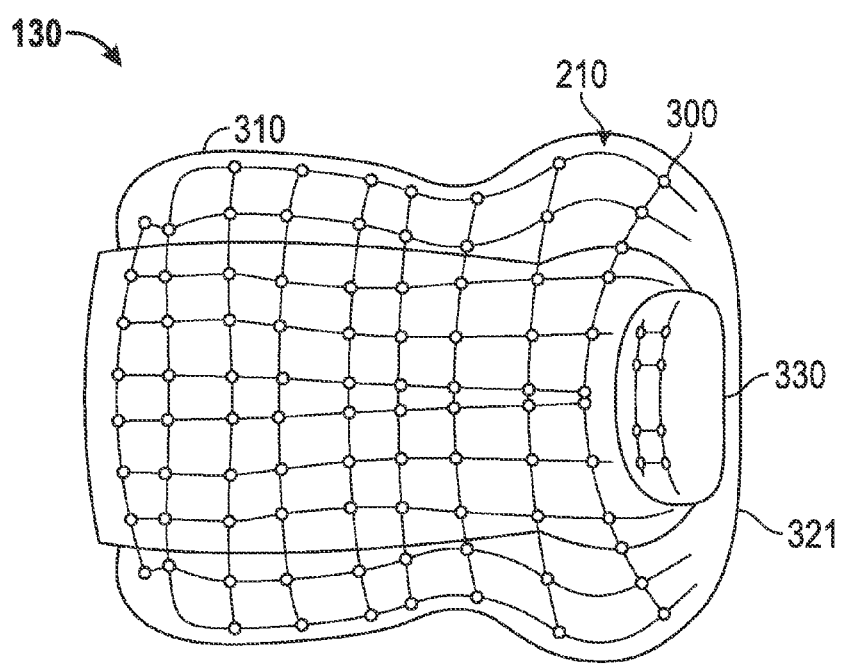
FIG. 4 is a schematic top view of a seat assembly associated with the driver identification system of FIG. 2 in accordance with an exemplary embodiment.

Reference is briefly made to FIGS. 3 and 4, which are schematic side and top views of the seat assembly 130 in accordance with an exemplary embodiment. In general, the seat assembly 130 may include a lower seat member 310, a seat back member 320, and a head rest 330. The lower seat member 310 defines a generally horizontal surface for supporting the driver. The seat back member 320 may be pivotally coupled to the lower seat member 310 and defines a generally vertical surface for supporting the back of the driver. The head rest 330 is operatively coupled to the seat back member 320 to support the head of the driver. Although not shown, the lower seat member 310, the seat back member 320, and the head rest 330 are each formed by a foam body mounted on a frame and covered with a cover (e.g., cover 340).

FIGS. 3 and 4 additionally show a schematic representation of the sensor group 210 of the driver identification system 150. As noted above, the sensor group 210 may include an array of sensors, e.g., sensors 300. The sensors 300 observe conditions associated with the seat assembly 130 and generate sensor signals based on the observed conditions. For example, the sensors 300 may be pressure sensors that indicate a pressure applied to the seat assembly 130 at a designated location. In general, the sensor group 210 may include a mix of sensor types. In one exemplary embodiment, sensor group 210 may include 2304 sensors in a 48 by 48 array. Other embodiments may include fewer sensors 300 or a greater number of sensors 300.

As shown, the sensor group 210 is arranged on the lower seat member 310, seat back member 320, and head rest 330. In other embodiments, the sensor group 210 may only be positioned in a portion of the seat assembly 130, such as just the lower seat member 310. In general, the sensor group 210 may be arranged in any suitable configuration. In one exemplary embodiment, the sensors 300 are arranged within or underneath the cover 340 of the respective member 310, 320, 330. In general, the sensors 300 are arranged to maximize occupant comfort while enabling appropriate information gathering. The arrangement of sensors 300 may be based on the particular seat design of the vehicle 100.

Returning to FIG. 2, the control module 220 is configured to receive information about the driver sitting in the seat assembly 130 from the sensor group 210, and based on this information, identify the driver. Subsequently, the control module 220 may generate commands for other components of the vehicle 100 based on this identity. Additional details about the control module 220 will be provided below.

As shown in FIG. 2, the control module 220 includes a number of functional units (or sub-modules) 222, 224, 226, 228 configured to perform the specific functions described below. These units 222, 224, 226, 228 may be coupled together with any suitable communications bus. In practice, the various units may be integrated with one another. In accordance with an exemplary embodiment, the control module 220 includes a data collection unit 222, an evaluation unit 224, a profile unit 226, and an interface 228.

The data collection unit 222 is configured to receive measured driver characteristics from the sensor group 210 corresponding to the physical attributes of the driver sitting in the seat assembly 130. In general, the data collection unit 222 receives, aggregates, and formats the data corresponding to the measured driver characteristics. In one exemplary embodiment, the data collection unit 222 may generate a pressure map of the measured driver characteristics.

The evaluation unit 224 receives the pressure map of driver characteristics and evaluates the pressure map in view of driver profiles stored in the profile unit 226. As described in greater detail below, the evaluation unit 224 calculates or derives a driver identifier from the pressure map. The driver identifier is a virtually unique signature or identifier associated with an individual driver. As such, the driver identifier functions a high dimensional security code using a specific discriminant function associated with the driver. In some instances, the driver identifier calculated from the pressure map may be referred to as the prospective driver identifier. As noted above, the profile unit 226 stores a collection of driver profiles for potential drivers, and in one exemplary embodiment includes a database. Each driver profile includes the driver identifier for an individual driver as well as the individual driver preferences.

As such, evaluation unit 224 is configured to compare the measured driver characteristics to the driver profiles in the profile unit 226 in order to affirmatively determine the identity of the driver in the seat assembly 130. In particular, the evaluation unit 224 may search the stored driver identifiers in the driver profiles in the profile unit 226 for the driver identifier calculated from the pressure map of the driver currently in the seat assembly 130. Upon a successful match, the driver is identified. If the prospective driver identifier fails to match a stored driver identifier, the evaluation unit 224 may determine that the driver is unidentified and take predetermined action, including taking no action and/or implementing predetermined responses to an unidentified driver. Additional details about the identification of individual drivers are provided below.

Upon identification of the driver, the evaluation unit 224 then generates commands to implement the driver preferences by providing the appropriate commands to the interface 228. In general, the interface 228 interacts with other components of the vehicle 100, including the components discussed above, e.g., electronic control unit 140, the infotainment system 142, climate system 144, seat adjustment system 146, and communication system 148.

As examples, the driver preferences implemented by the evaluation unit 224 via the interface 228 may include automatic engine ignition and/or setting of the driving styles via the electronic control unit 140. The driver preferences may further include automatic settings associated with the individual driver for the infotainment system 142, such as a predetermined navigation route or radio settings. Other driver preferences may further include automatic climate settings for the climate system 144 and automatic seat settings for the seat adjustment system 146. The evaluation unit 224 may also generate messages and/or provide driver information to an off-board information center or other third party via the communication system 148. In some exemplary embodiments, the interface 228 may generate a message with an output device, such as a display associated with infotainment system 142, confirming identification of the driver. As noted above, if the driver is unidentified, the evaluation unit 224 may implement predetermined responses, including maintaining or actuating an ignition lock via the electronic control unit 140 to prevent the unidentified driver from operating the vehicle 100.

As noted above, the driver identification system 150 uses driver profiles with driver identifiers and preferences. In one exemplary embodiment, the driver identification system 150 may have a programming or learning mode that enables a new driver to establish a driver profile, driver identifier, and driver preferences. Upon proper authorization, such as with a key or at a dealer, the new driver may sit in the seat assembly 130 such that the sensor group 210 gathers information about the physical characteristics of the driver, and based on this data, the control module 220 generates a driver identifier to store in a driver profile. Upon calculation of the driver identifier, the driver may define the driver preferences via a user input, such as with the user interface 230. Similarly, a driver with an existing profile, and thus an existing driver identifier, may use the user interface 230 to modify or establish driver preferences in the driver profile. In one exemplary embodiment, the interface 230 may function as an interface to enable modification of the driver preferences in the driver profile stored in the profile unit 226. A learning mode may be provided via a driver information center and optionally include password identification.

Generally, the control module 220, and thus the sub-modules 222, 224, 226, 228, may include any type of processor or multiple processors, single integrated circuits such as a microprocessor, or any suitable number of integrated circuit devices and/or circuit boards working in cooperation to accomplish the functions described herein. During operation, such processors may execute one or more instructions stored within memory, which may be any type of suitable memory, including various types of dynamic random access memory (DRAM) such as SDRAM, various types of static RAM (SRAM), and various types of non-volatile memory (PROM, EPROM, and flash).

Figure 5:
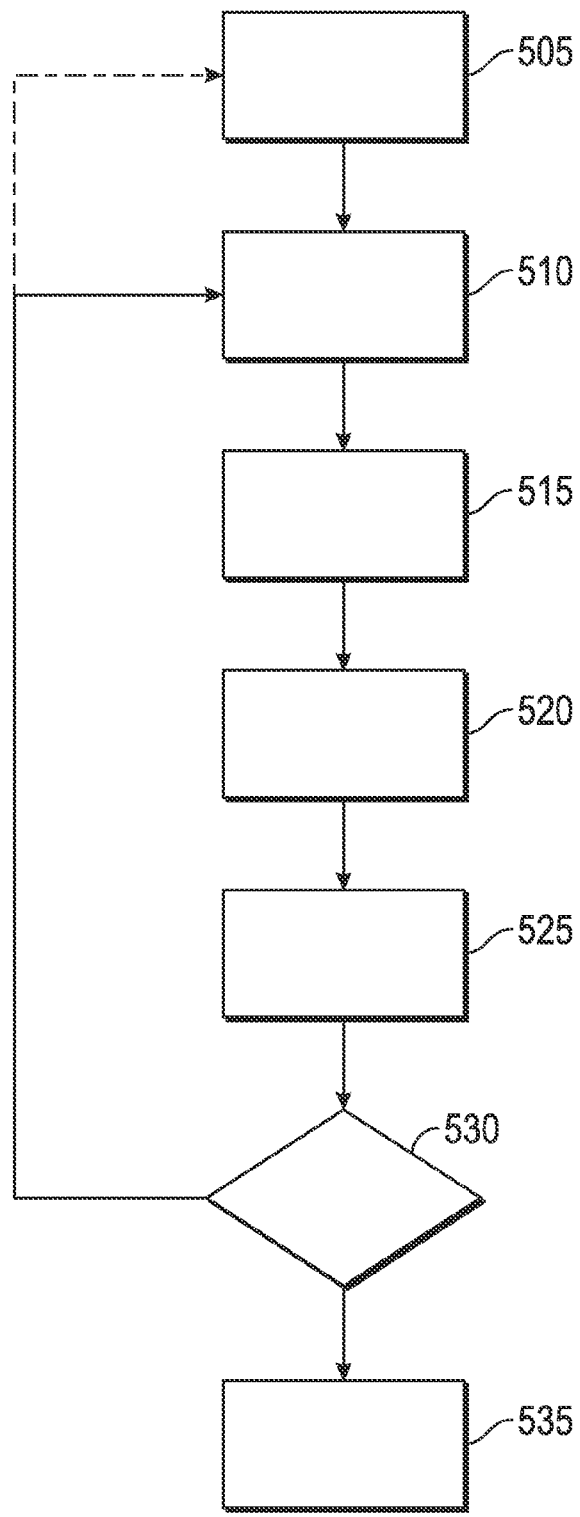
FIG. 5 is a flow chart of a method for identifying a driver in a vehicle in accordance with an exemplary embodiment.

FIG. 5 is a flow chart of a method 500 for identifying a driver in a vehicle in accordance with an exemplary embodiment. The method 500 may be implemented by the driver identification system 150 of the vehicle 100 discussed above. As such, reference is additionally made to FIGS. 1-4.

In step 505, in one example, the driver identification system 150 is activated by a person sitting in the seat assembly 130 (e.g., the driver). In step 510, the sensor group 210 of the driver identification system 150 collects information about the physical characteristics of the driver. In step 515, the control module 220 forms a pressure map associated with the physical characteristics. In step 520, the evaluation unit 224 of the control module 220 calculates a driver identifier from the pressure map. In step 525, the evaluation unit 224 searches driver profiles stored in a profile unit 226 based on the driver identifier. In step 530, if the search is successful, the method 500 proceeds to step 535. In step 530, if the search is unsuccessful, thereby failing to identify the driver as an authorized driver, the method 500 may loop to step 505 or 510. In an alternative embodiment, upon an unsuccessful identification, the control module 220 may provide a message to the unidentified occupant (e.g., via the infotainment system 142) and/or prevent operation of the vehicle 100 (e.g., via the electronic control unit 140). In step 535, the interface 228 of the control module 220 generates commands to implement driver preferences associated with the identified driver to the various vehicle system, including electronic control unit 140, the infotainment system 142, climate system 144 adjustment system 146, and communication system 148 for the preferences discussed above.

As noted above, the array of sensors 300 in the sensor group 210 enables the identification of the driver by collecting physical characteristics of the driver and comparing the physical characteristics to driver profiles. As also noted above, the physical characteristics may be represented by a virtually unique driver identifier. The driver identifier is independent of the seat assembly and establishing the driver identifier with respect to different types of seat assemblies further enhances the unique nature of the driver identifier. The accuracy is not impacted by reasonable seating position. As one example, pressure maps of driver characteristics are established for 15 individual drivers and measured on three different driver seat assemblies, thereby creating 135 pressure maps of driver characteristics that may be used to develop a 14-dimensional functional space onto which the pressure maps of driver characteristics may be projected as a single point, thereby enabling each of the 15 individualized discriminant functions to evaluate the proximity of each point to each centroid. Other combinations may be provided to establish the driver identifier. As potential drivers are evaluated to establish driver identifiers, the unique nature of the driver identifier may be enhanced by increasing the dimensionality of the discriminant space. Additional details about the calculation of the driver identifier are provided in the more general discussion below.

The driver identification system 150 may use any suitable technique for calculating a driver identifier from the pressure map. In one exemplary embodiment, Linear Discriminant Analysis (LDA) is utilized as a statistical approach for dimensionality reduction with respect to multiple potential drivers. LDA computes an optimal transformation or projection by minimizing the within-class distance and maximizing the between-class distance simultaneously, thus achieving maximum class discrimination. As such, LDA may reduce dimensionality while preserving as much of the class discriminatory information as possible. Principal component analysis is used to deal with the singularity problem.

As an example, considering a set of D-dimensional sample $\{x^1, x^2, \ldots, x^n\}$, $N_1$ of which belong to class $\omega_1$, and $N_2$ to class $\omega_2$, a scalar y may be obtained by projecting the samples x onto a line $y=w^T x$ selected to maximize the separation of the scalars. In order to find an appropriate projection vector, a measure of separation may be defined. The mean vector of each class in x-space is represented by Equation (1) below:

$$\mu_i = \frac{1}{N_i} \sum_{x \in \omega_i} x \qquad \text{Equation (1)}$$

The mean vector of each class in the y-space is represented by Equation (2) below:

$$\tilde{\mu}_i = w^T \mu_i. \qquad \text{Equation (2)}$$

The objective function may be defined as the distance between the projected means, as represented by Equation (3) for a two class case below:

$$J(w) = |\tilde{\mu}_1 - \tilde{\mu}_2| = |w^T(\mu_1 - \mu_2)| \qquad \text{Equation (3)}$$

However, in some instances, the distance between projected means may not be an acceptable measure because it does not include the scattering within classes. Alternatively, a function maximizing the difference between the means, normalized by a measure of the within-class scatter may be defined as the objective function. For each class the scatter may be defined as represented by Equation (4) below:

$$\tilde{S}_i^2 = \Sigma_{y \in \omega_i}(y - \tilde{\mu}_i)^2 \qquad \text{Equation (4)}$$

The Fisher linear discriminant is defined as the linear function $w^T x$ that maximizes the criterion function, as represented by Equation (5) below:

$$J(w) = \frac{|\tilde{\mu}_1 - \tilde{\mu}_2|^2}{\tilde{S}_1^2 + \tilde{S}_2^2} \qquad \text{Equation (5)}$$

Therefore, the search is for a projection w such that samples from the same class are projected very close to each other and the projected means are as separate as possible. The scatter of the projection y can be expressed as a function of the scatter matrix in the feature space x, as represented by Equation (6) below:

$$\tilde{S}_1^2 + \tilde{S}_2^2 = w^T S_w w \qquad \text{Equation (6)}$$

where $S_w$ is defined as $$S_1 + S_2 = S_w \text{ and } S_i = \Sigma_{x \in \omega_i}(x - \mu_i)(x - \mu_i)^T$$

Similarly, the between-class scatter is represented by the matrix $S_B$, which may be expressed in term of the projected means as represented by Equation (7) below:

$$w^T(\mu_1 - \mu_2)(\mu_1 - \mu_2)^T w = w^T S_b w \qquad \text{Equation (7)}$$

The Fisher criterion, expressed in terms of $S_w$ and $S_B$, may be represented by Equation (8) below:

$$J(w) = \frac{w^T S_B w}{w^T S_w w} \qquad \text{Equation (8)}$$

To find the maximum of J(w), take the derivative, equate to zero, then solve the generalized eigenvalue problem, yielding the following Equation (9):

$$w^* = \text{argmax}\left[\frac{w^T S_B w}{w^T S_w w}\right] = S_w^{-1}(\mu_1 - \mu_2) \qquad \text{Equation (9)}$$

Fisher's Linear Discriminant Analysis generalizes to a C-class problem that seeks (C-1) projections $[y_1, y_2, \ldots, y_{C-1}]$; using (C-1) projection vectors $w_i$ in the projection matrix, represented by Equation (10) below:

$$W = \langle w_1 | \ldots | w_{C-1} \rangle \qquad \text{Equation (10)}$$

The within-class scatter generalizes as $S_w = \Sigma_{i=1}^{C} S_i$ and the between-class scatter may be represented by Equation (11) below:

$$S_B = \Sigma_{i=1}^{C} N_i(\mu_i - \mu)(\mu_i - \mu)^T \qquad \text{Equation (11)}$$

where μ is the grand average

The projection is no longer a scalar, but has C-1 dimensions. The determinant of the scatter matrices is used to obtain a scalar objective function represented by Equation (12) below:

$$J(W) = \frac{|W^T S_B W|}{|W^T S_W W|} \quad \text{Equation (12)}$$

The optimal projection matrix W* has columns of eigenvectors corresponding to the largest eigenvalues of the generalized eigenvalue problem represented by Equation (13) below:

$$W^* = \langle w_1^* | w_2^* | \ldots w_{C-1}^* \rangle = \text{argmax} \frac{|W^T S_B W|}{|W^T S_W W|} \quad \text{Equation (13)}$$

LDA has been widely used in many applications involving high-dimensional data. However, classical LDA requires the so-called total scatter matrix ($S_T = S_B + S_w$) to be nonsingular. In many applications involving high-dimensional and low sample size, the total scatter matrix can be singular. One of the approaches used to deal with the singularity problem is the use of principal component analysis (PCA). In PCA, a linear projection of x is used, as represented by Equation (14) below $$z = p^T x \quad \text{Equation (14)}$$

The first principal component of x is such that the variance of the projection z is maximized and p is constrained to a unit vector, as represented by Equations (15) below:

$$\max_p J(p) = E\{z^2\} = E\{(p^T x)^2\}, s.t. \ p^T p = 1$$

$$\max_p J(p) = p^T S p, s.t. \ p^T p = 1 \quad \text{Equations (15)}$$

where S is the covariance matrix of x

The sorted eigenvalues of S are $\lambda_1 \geq \lambda_2 \geq \ldots \geq \lambda_D$ and eigenvectors are $\{e_1, \ldots, e_D\}$ where D is the dimension of the vector x. As such, the first PC may be represented by Equation (16) below:

$$z_1 = e_1^T x \quad \text{Equation (16)}$$

This is generalized to m PCs, where m<D, with the additional constrain represented by Equation (17) below:

$$E\{y_m y_k\} = 0, k < m \quad \text{Equation (17)}$$

The solution to $\max_p J(p)$ may therefore be represented by Equation (18) below:

$$p_k = e_p \quad \text{Equation (18)}$$

The type of analysis discussed above may enable the determination of a virtually unique driver identifier. In particular, the occupant pressure map is statistically transformed into a vector determined by the deviation of specific pressure distribution from the grand mean of a control population. The deviation may be measured by transforming the sensor data into a greatly reduced principle component vectors, while the number of principle component required is at least an order of magnitude less than the number of sensors 300 in the seat assembly 140. As such, the identifier is formed by a string of coordinates that locate an individual in a C-1 dimensional space, which itself is dependent on the number of individuals in the data set, such that collected data at or proximate to these coordinates may positively identify the driver.

Accordingly, the driver identification system 150 enables the automatic identification of the driver without affirmative input, such as without a key fob or key. Identification of the driver enables any number of personalized settings, including keyless vehicle starting, thereby enhancing the driver experience and comfort. Additionally, identification of the driver in this manner may eliminate equipment for other mechanisms of driver identification and/or vehicle actuation, such a start push button starting. The driver identification system 150 further enables improved vehicle security and safety by preventing the vehicle from starting without driver recognition.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle system for a vehicle with an occupant, comprising:
   a driver seat assembly;
   a sensor group comprising an array of pressure sensors incorporated into the driver seat assembly and configured to collect data about physical characteristics of the occupant of the driver seat assembly, wherein the array of pressure sensors is formed by a first number of pressure sensors; and
   a control module coupled to the sensor group and storing a plurality of driver profiles, each associated with a stored driver identifier and driver preferences, wherein the control module is further configured to
   generate a pressure map of the physical characteristics of the occupant based on the data,
   determine a prospective driver identifier of the occupant based on the pressure map, wherein the control module is configured to determine the prospective driver identifier by statistically transforming the pressure map into a second number of principle component vectors defined by respective deviations of the pressure map relative to a control population mean, wherein the second number is at least an order of magnitude less than the first number, wherein the prospective driver identifier is virtually unique to the occupant as an individual and independent of occupant seat position on the driver seat assembly,
   compare the prospective driver identifier to the stored driver identifiers of the plurality of driver profiles, and
   select one of the driver profiles upon matching the prospective driver identifier to the stored driver identifier associated with the one driver profile.

2. The vehicle system of claim 1, wherein the driver seat assembly includes a lower seat member, and wherein the array of pressure sensors is arranged in the lower seat member.

3. The vehicle system of claim 1, wherein the control module is configured to implement the driver preferences associated with the selected driver profile.

4. The vehicle system of claim 3, wherein the driver preferences include at least one of keyless ignition, seat assembly settings, and infotainment settings.

5. An identification system for an occupant of vehicle, comprising:
   a driver seat assembly;
   a sensor group comprising an array of pressure sensors incorporated into the driver seat assembly and configured to collect data about physical characteristics of the occupant of the driver seat assembly, wherein the array of pressure sensors is formed by a first number of pressure sensors; and a control module coupled to the sensor group and storing a plurality of driver profiles, each associated with a stored driver identifier and driver preferences, wherein the control module is configured to generate a pressure map of the physical characteristics of the occupant based on the data, determine a prospective driver identifier of the occupant based on the pressure map, wherein the prospective driver identifier is virtually unique to the occupant as an individual and independent of occupant seat position on the seat assembly, wherein the control module is configured to determine the prospective driver identifier by statistically transforming the pressure map into a second number of principle component vectors defined by respective deviations of the pressure map relative to a control population mean, wherein the second number is at least an order of magnitude less than the first number, compare the prospective driver identifier to the stored driver identifiers of the plurality of driver profiles, select one of the driver profiles upon matching the prospective driver identifier to the stored driver identifier associated with the one driver profile, and implement the driver preferences associated with the matched stored driver identifier.

6. The identification system of claim 5, wherein the driver preferences include at least one of keyless ignition, seat assembly settings, and infotainment settings.

7. A method for identifying a driver of a vehicle, comprising:

collecting information about physical characteristics of the driver with an array of pressure sensors incorporated into a driver seat assembly, wherein the array of pressure sensors is formed by a first number of pressure sensors;

generating a pressure map of the physical characteristics of the driver based on the collected information;

determining a prospective driver identifier of the driver from the pressure map, wherein the prospective driver identifier is virtually unique to the driver as an individual and independent of driver seat position on the driver seat assembly, wherein the control module is configured to determine the prospective driver identifier by statistically transforming the pressure map into a second number of principle component vectors defined by respective deviations of the pressure map relative to a control population mean, wherein the second number is at least an order of magnitude less than the first number;

comparing the prospective driver identifier to stored driver identifiers of a plurality of driver profiles; and selecting one of the driver profiles upon matching the prospective driver identifier to the stored driver identifier associated with the one driver profile.

8. The method of claim 7, wherein the selected driver profile includes driver preferences and wherein the method further comprises implementing the driver preferences.

9. The method of claim 8, wherein the calculating the prospective driver identifier includes calculating the driver identifier with linear discriminate analysis.

10. The vehicle system of claim 1, wherein, when the prospective driver identifier fails to match any of the stored driver identifiers, the control module is configured to prevent the occupant from operating the vehicle.

11. The identification system of claim 5, wherein, when the prospective driver identifier fails to match any of the stored driver identifiers, the control module is configured to prevent the occupant from operating the vehicle.

12. The vehicle system of claim 1, wherein the stored driver identifiers are each a high dimensional security code using a specific discriminant function associated with the respective individual.

* * * * *